Figure 1:
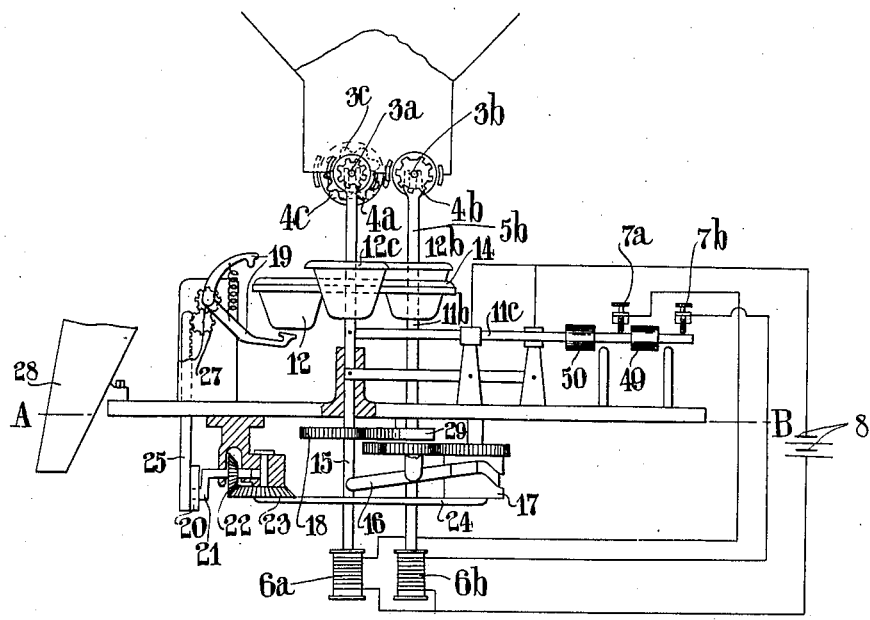

W. POPOW.
APPARATUS FOR AUTOMATICALLY WEIGHING PULVERIZED MATERIALS.
APPLICATION FILED FEB. 13, 1912.

1,149,079.

Patented Aug. 3, 1915.
2 SHEETS—SHEET 1.

WITNESSES

INVENTOR
W. Popow
BY
ATTORNEY

W. POPOW.
APPARATUS FOR AUTOMATICALLY WEIGHING PULVERIZED MATERIALS.
APPLICATION FILED FEB. 13, 1912.
1,149,079.
Patented Aug. 3, 1915.
2 SHEETS—SHEET 2.
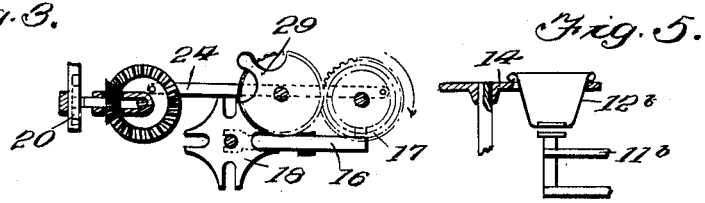
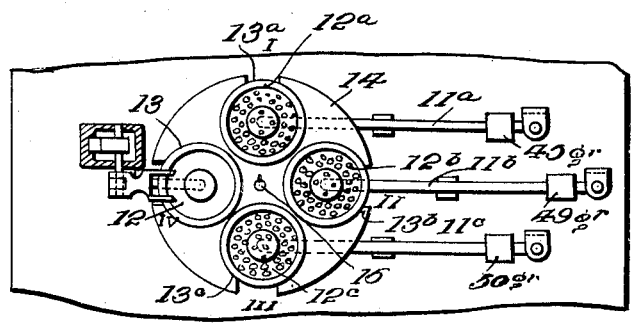
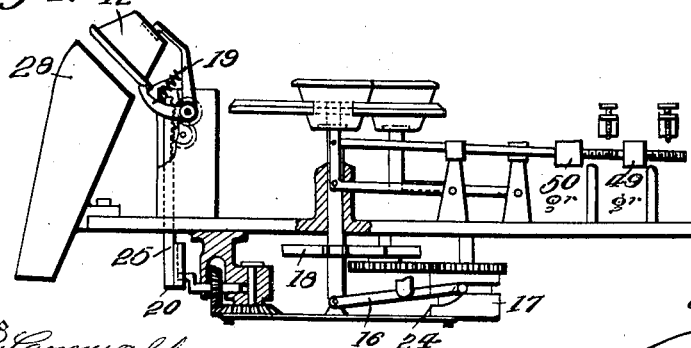

UNITED STATES PATENT OFFICE.

WLADIMIR POPOW, OF ST. PETERSBURG, RUSSIA.

APPARATUS FOR AUTOMATICALLY WEIGHING PULVERIZED MATERIAL.

1,149,079.    Specification of Letters Patent.    Patented Aug. 3, 1915.

Original application filed February 1, 1910, Serial No. 541,378. Divided and this application filed February 13, 1912. Serial No. 677,379.

*To all whom it may concern:*

Be it known that I, WLADIMIR POPOW, a subject of the Czar of Russia, and residing at Kamennoostrowsky Prsp. No. 57/1, St. Petersburg, Russia, have invented a certain new and useful Improved Apparatus for Automatically Weighing Pulverized Material, of which the following is a specification.

This invention relates to a process for automatically weighing pulverized material and consists essentially in successively weighing a given quantity of material on several weighing beams with a gradually diminishing error of weighing. Then if it is desired to obtain a quantity of any given material of 50 grms. for instance, a smaller quantity of say about 45 grms. has to be weighed on the first weighing beam with a greater or less error, and this quantity is transferred to another weighing beam, on which the weight is increased up to about 49 grms. but with a smaller error in weighing. From the second weighing beam the material is transferred to a third weighing beam on which its weight is increased up to 50 grms. with a negligibly small error of weighing. Thus, before the required amount of 50 grms. of the material is weighed a preliminary rough weighing of any desired smaller amount of the material is taken, and the latter is loaded in turn onto the next weighing beam with a gradually diminishing error until finally the required weight is obtained.

The invention will now be described with reference to the accompanying drawings in which:—

Figure 1. is an elevation of the weighing apparatus when the pans are unloaded. Fig. 2. is a plan view of a part of the driving mechanism of the apparatus. Fig. 3. is a plan view of the main parts of the apparatus. Fig. 4. is an elevation of the modified apparatus in its discharging position. Fig. 5 is a detail showing one of the weighing pans and its supporting devices in section. Fig. 6 is a diagrammatic representation showing, in development the connection between the feeding mechanism and the weighing beams.

$11^a$, $11^b$, and $11^c$ are the weighing beams, and $12^a$, $12^b$ and $12^c$ the pans which are provided with beaded edges and are supported on platforms provided on said beams, in the positions marked I, II and III respectively.

14 is a disk having openings $13^a$, $13^b$ and $13^c$ through which the pans freely pass when they are on the platforms of the weighing beams, an opening 13 in the same disk shown in the position marked IV being destined to receive a pan 12 which is held in its position by projections or handles $11^d$. During the operation of the apparatus all the pans take this position in turn in order to be discharged by a suitable clamping device 19.

It is obvious that although three weighing beams are shown on the drawings, their number may be varied as desired.

The material is fed onto the pans by means of the feeders $3^a$, $3^b$ and $3^c$ rotated by means of suitable mechanism through the clutches $4^a$, $4^b$ and $4^c$ which are thrown into and out of engagement by means of rods two of which, $5^a$, $5^b$, may be seen in Fig. 1. These rods are actuated by means of the solenoids of which two, $6^a$ and $6^b$, are shown. When a weighing pan receives its load the associated balance beam is oscillated and contact is made with the screws associated with the beam; the screws $7^a$ and $7^b$ are to be observed in the figure. In these circumstances current flows from a battery 8 through the solenoids and thus operates the clutch so as to cause the rotation of the corresponding feeder to cease. This cessation of the feed will occur in the apparatus provided with counterweights corresponding to loads of 45, 49 and 50 grams respectively when the pan is in the position IV.

By means of some suitable arrangement, such as Maltese wheel gearing 18 and 29 driving the shaft 15, the disk 7 is then rotated through 90° so that the pan $12^d$ which had not received any material to be weighed is brought from the position IV into the position I, the pan $12^a$ from the position I into the position II, the pan $12^b$ from the position II into the position III, and the pan $12^c$ which had received the full weight of material from the position III into the position IV. Owing to the periodical rotation of the cam 17 the disk 7 is now lowered and the pans $12^d$ $12^a$ and $12^b$ are thereby placed on to the weighing beams $11^a$ $11^b$ and $11^c$ whereafter the feeding device is immediately caused to operate and to supply the pan 12 with a new quantity of 45 grms. of material, to increase the 45 grms. in the pan 12$^a$ to 49 grms. and to complete the required 50 grms. in the pan 12$^b$.

Simultaneously with the downward movement of the disk 14 the clamping device 19 is set in motion and seizing that pan which is in the position IV and which contains the required 50 grms. of materials, gives it a semi-circular movement in a forward direction, thus discharging the material into the receiving tube 28 and when moving backward, places the pan back into its position IV from which position the same is transferred to position I by the further movement of the apparatus in order to obtain a new quantity of materials to be weighed, and so on. The clamping device 19 is also operated from the cam by means of a guiding lever 24, a bevel gear 22, 23, a crank 21 and a slotted guide 20 which arrangements operate the lower claw of the clamping device through the agency of the toothed bar 25 and the toothed wheels 26, 27. As soon as the lower claw has seized the pan, it lifts the same up to the upper claw which is placed under the action of a spring, thus clamping the weighing pan between both of said claws and tipping the same for the purpose of discharging the materials into the receiving tube. The cam 17 is adapted to perform a full rotation after the feeding device has ceased its operation during which rotation it effects all movements as the changing of the positions of the pans from one weighing beam to the other as well as the discharging of the pans. In this manner the above described process of automatic weighing by using interchangeable pans renders it possible to weigh greater or less amounts of material on several weighing beams with a gradually diminishing error without difficulty. Apart from this it will be convenient to weigh also small quantities of the material by the means of this process with interchangeable pans. Finally, it is possible by the application of the process with interchangeable pans to weigh alternately in each cycle different quantities of the material which are supplied by means of an automatic device. This is obtained by making the different pans of the system to be used, of different weights. It is obvious that a heavier pan will always receive and deliver a relatively smaller quantity of the material. Thus for instance in a system of four pans it is possible to obtain alternately up to four different quantities of weighed material in each cycle of operation of the automatic device.

Having now described my invention what I claim as new and desire to secure by Letters Patent is:—

1. An automatic weighing machine, comprising a plurality of weighing pans, balance beams therefor arranged about a central axis, a disk periodically rotated about said axis and provided with apertures to receive the weighing pans, all for the purpose set forth.

2. An automatic weighing machine comprising four weighing pans, three weighing beams therefor, a platform adapted to receive a pan on one arm of each of said beams on the other arm of each of said beams, a counterpoise and a disk adapted by rotation to transfer the weighing pans from the first weighing position to the second weighing position, from the second to the third, the third to a fourth position so that the position may be discharged and the empty pan to the first position, in the interval between the weighings, means for rotating the disk.

3. An automatic weighing machine, comprising four weighing pans, three weighing beams therefor, a platform adapted to receive a pan on one arm of each of said beams on the other arm of each of said beams, a counterpoise; a disk adapted by rotation to transfer the weighing pans from the first weighing position to the second weighing position, from the second to the third, the third to a fourth position so that the position may be discharged and the empty pan to the first position, in the interval between the weighings; means for rotating the disk, a gripping mechanism in operative connection therewith said gripping mechanism being adapted to grip the filled pan and to be actuated about an axis to discharge the contents of the said pan and to replace the empty pan in the disk.

4. An automatic weighing machine, comprising a plurality of weighing pans, balance beams therefor arranged about a central axis, a feeding device above the pans upon the weighing beams adapted to supply a large proportion of the total weight of material to the first weighing pan of the series, and to add successively decreasing quantities to the successive pans, a disk periodically rotated about the above mentioned axis and provided with apertures to receive the weighing pans.

5. An automatic weighing machine, comprising a plurality of weighing pans, balance beams therefor arranged about a central axis, a feeding device above the pans upon the weighing beams adapted to supply a large proportion of the total weight of material to the first weighing pan of the series, and to add successively decreasing quantities to the successive pans, a disk periodically rotated about the above mentioned axis and provided with apertures to receive the weighing pans; and means for removing and emptying the fully loaded pan.

6. An automatic weighing machine, comprising four weighing pans, three weighing beams therefor, a platform on one arm of each of said beams, adapted to receive a pan; on the other arm of each of the said beams, a counterpoise, a contact piece adapted to make electrical contact when the pan and counterpoise are in equilibrium; a feeding device comprising means arranged above the first weighing beam for delivering to the pan a quantity of material less than the total weight required; a device for cutting off the supply of material to the pan, operated by the abovementioned contacts; similarly operated means for delivering a smaller quantity of material, insufficient to make up the total weight to the second pan of the series; like means arranged above the third pan to deliver a still smaller quantity of material sufficient to make up the total weight; a disk adapted by rotation to transfer the weighing pans from the first weighing position to the second weighing position, from the second to the third, the third to the discharge position and the empty pan to the first position, in the interval between the weighings and means for rotating the disk.

7. An automatic weighing machine, comprising four weighing pans, three weighing beams therefor, a platform on one arm of each of said beams, adapted to receive a pan; on the other arm of each of the said beams, a counterpoise, a contact piece adapted to make electrical contact when the pan and counterpoise are in equilibrium; means arranged above the first weighing beam for delivering to the pan a quantity of material less than the total weight required; a device for cutting off the supply of material to the pan, operated by the abovementioned contacts; similarly operated means for delivering a smaller quantity of material, insufficient to make up the total weight to the second pan of the series; like means arranged above the third pan to deliver a still smaller quantity of material sufficient to make up the total weight; a rotating disk adapted to transfer the weighing pans from the first weighing position to the second weighing position, from the second to the third, the third to the discharge position and the empty pan to the first position, in the interval between the weighings; a gripping mechanism in operative connection with the means for rotating the disk, adapted to grip the filled pan and to be actuated about an axis to discharge the contents of the said pan, and to replace the empty pan in the disk.

8. An automatic weighing machine, comprising four weighing pans, three weighing beams therefor, a platform on one arm of each of said beams, adapted to receive a pan; on the other arm of each of the said beams, a counterpoise, a contact piece on each of the said beams adapted to make electrical contact when the pan and counterpoise are in equilibrium; a feeding device comprising means arranged above the first weighing beam for delivering to the pan a quantity of material less than the total weight required; a device for cutting off the supply of material to the pan, operated by the abovementioned contacts, similarly operated means for delivering a smaller quantity of material insufficient to make up the total weight to the second pan of the series; like means arranged above the third pan to deliver a still smaller quantity of material sufficient to make up the total weight; a disk, apertures therein to receive the pans; means adapted to raise the said disk after the pans have been weighed, means for rotating the disk so as to bring the empty pan into the first weighing position, the first to the second position, the second to the third and the third to a fourth position so that the material may be discharged; a gripping mechanism in operative connection with the means for rotating the disk, adapted to grip the filled pan and to be actuated about an axis to discharge the contents of the said pan, and to replace the empty pan in the disk.

9. An automatic weighing machine, comprising four weighing pans, having different weights, three weighing beams therefor, a platform on one arm of each of said beams, adapted to receive a pan; on the other arm of each of the said beams, a counterpoise, each counterpoise having a weight greater than the preceding counterpoise but not exceeding a maximum corresponding with the greatest load, a contact piece on each of said beams adapted to make electrical contact when the pan and counterpoise are in equilibrium; a feeding device comprising means arranged above the first weighing beam for delivering to the pan a quantity of material less than the total weight required; a device for cutting off the supply of material to the pan, operated by the above mentioned contacts; similarly operated means for delivering a smaller quantity of material insufficient to make up the total weight to the second pan of the series; like means arranged above the third pan to deliver a still smaller quantity of material sufficient to make up the total weight; a disk, apertures therein to receive the pans; means adapted to raise the said disk after the pans have been weighed, means for rotating the disk so as to bring the empty pan into the first weighing position, the first to the second position, the second to the third and the third to a fourth position so that the material may be discharged; a gripping mechanism in operative connection with the means for rotating the disk, adapted to grip the filled pan and to be actuated about an axis to discharge the contents of the said pan, and to replace the empty pan in the disk.

10. An automatic weighing machine, comprising four weighing pans, having different weights, three weighing beams therefor, a platform on one arm of each of said beams, adapted to receive a pan; on the other arm of each of the said beams, a counterpoise, each counterpoise having a weight greater than the preceding counterpoise but not exceeding a maximum corresponding with the greatest load, a contact piece on each of said beams adapted to make electrical contact when the pan and counterpoise are in equilibrium; a feeding device comprising means arranged above the first weighing beam for delivering to the pan a quantity of material less than the total weight required, a clutch associated with said means, a member attached to said clutch, a solenoid associated with said member, electric conductors connected to the solenoid, one conductor connected to the corresponding contact piece the other to an electric current supply, said contact being adapted to permit the current to pass through the solenoid, when the corresponding balance beam is in equilibrium, to cut off the supply of material to the pan; similarly operated means for delivering a smaller quantity of material insufficient to make up the total weight to the second pan of the series; like means arranged above the third pan to deliver a still smaller quantity of material sufficient to make up the total weight to the third pan of the series; a disk, apertures therein to receive the pans; means adapted to raise the said disk after the pans have been weighed, means for rotating the disk so as to bring the empty pan into the first weighing position, the first to the second position, the second to the third and the third to a fourth position so that the material may be discharged; a gripping mechanism in operative connection with the means for rotating the disk, adapted to grip the filled pan and to be actuated about an axis to discharge the contents of the said pan, and to replace the empty pan in the disk.

In testimony whereof I have signed my name to this specification in the presence of two subscribing witnesses.

WLADIMIR POPOW.

Witnesses:
  ANATALE AGLITZKY,
  H. A. LOVIARGEIME.